May 1, 1951  
C. F. WALLACE  
2,551,479  
ELECTRICAL DETECTION AND MEASUREMENT OF FLUID CONDITIONS  
Filed April 22, 1947  
6 Sheets-Sheet 1
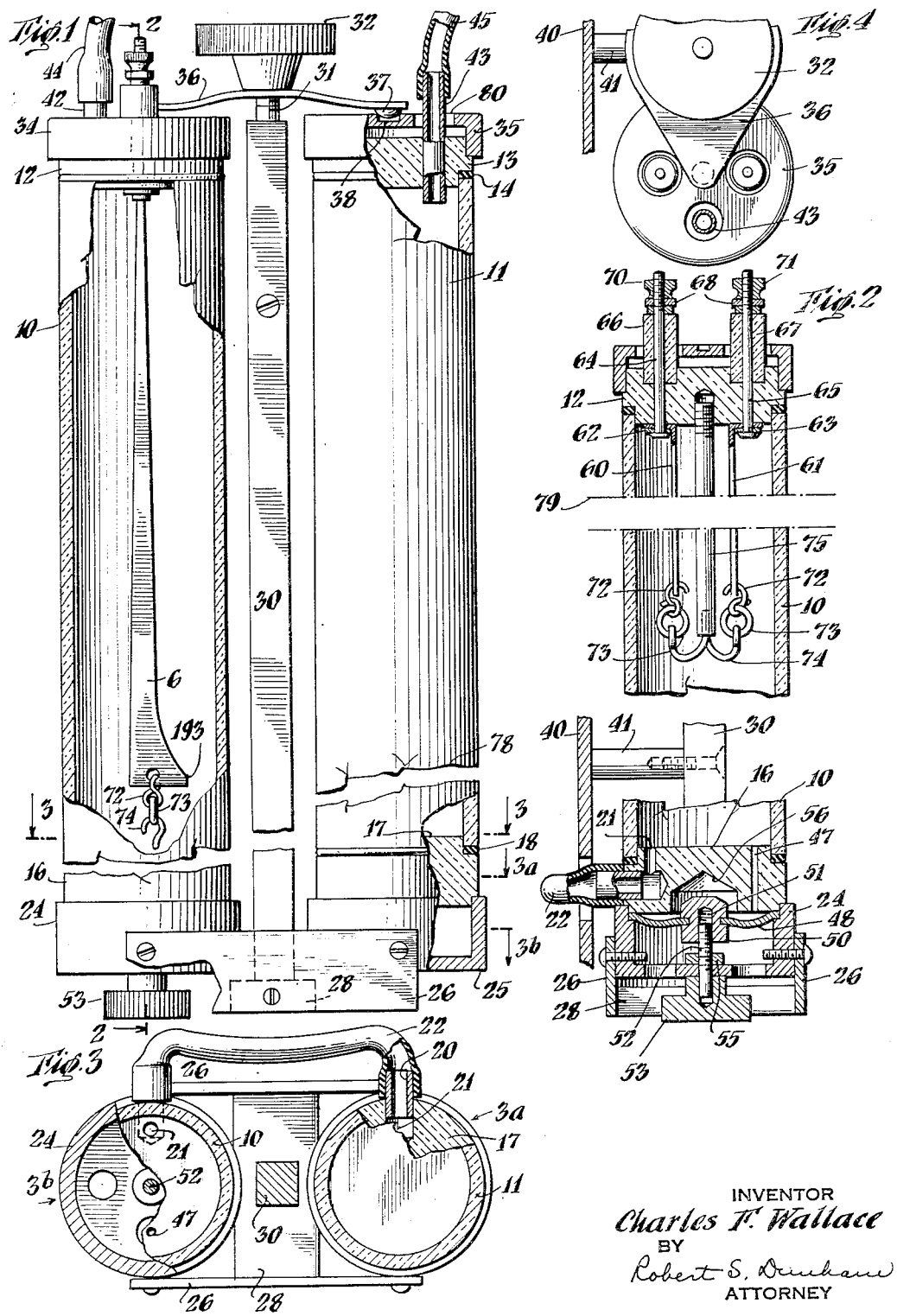
INVENTOR  
*Charles F. Wallace*  
BY  
*Robert S. Dunham*  
ATTORNEY

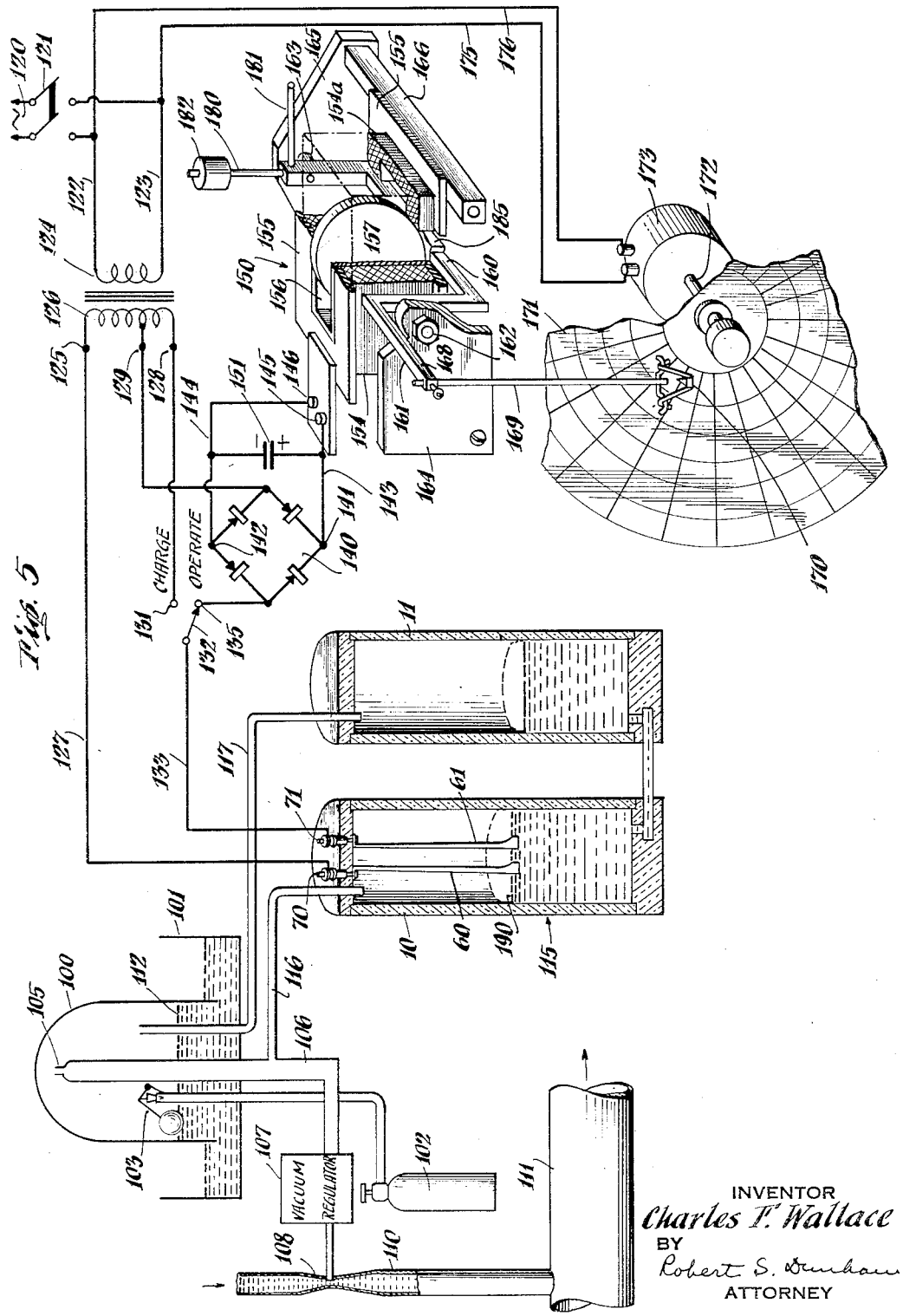

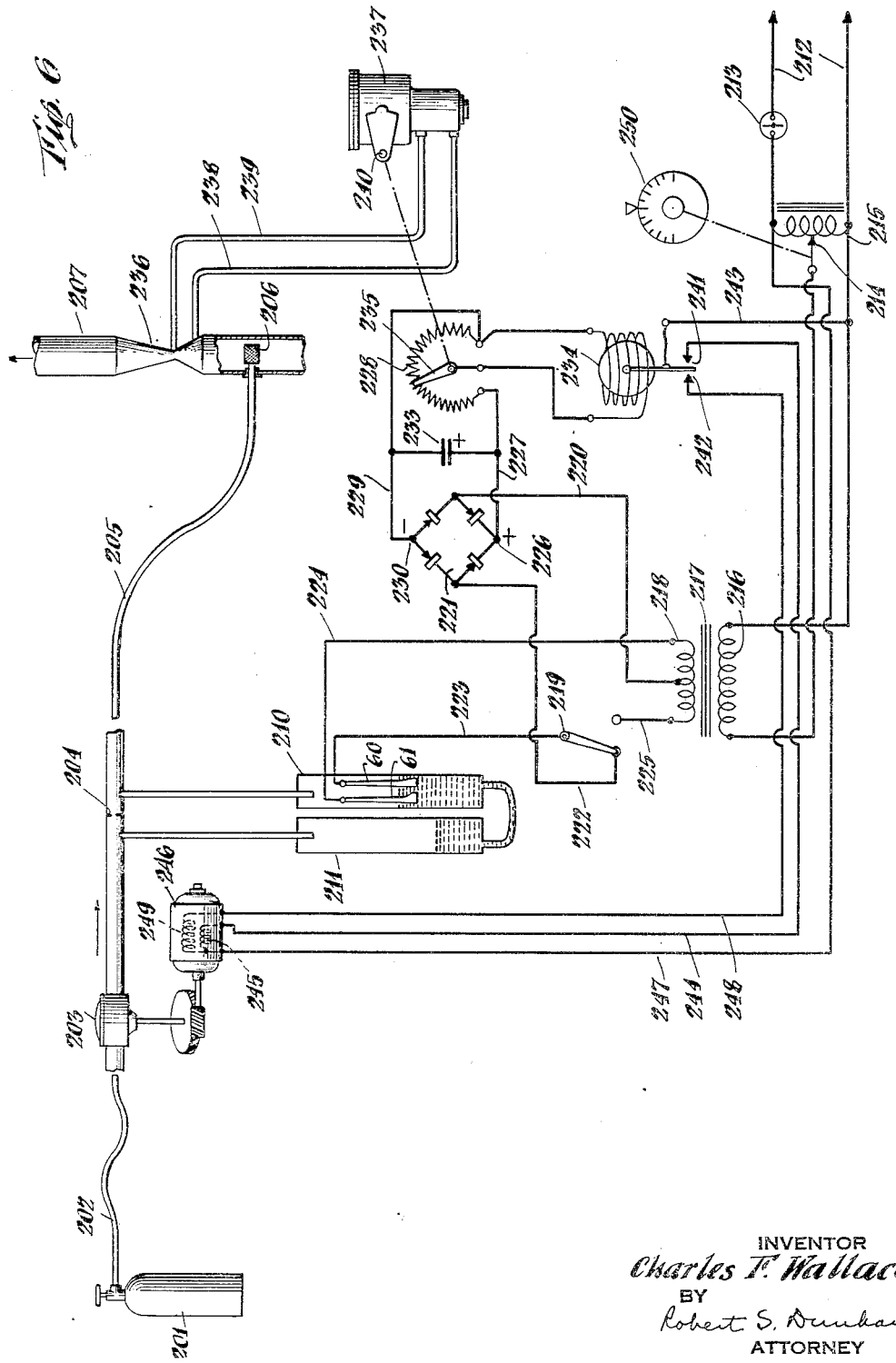

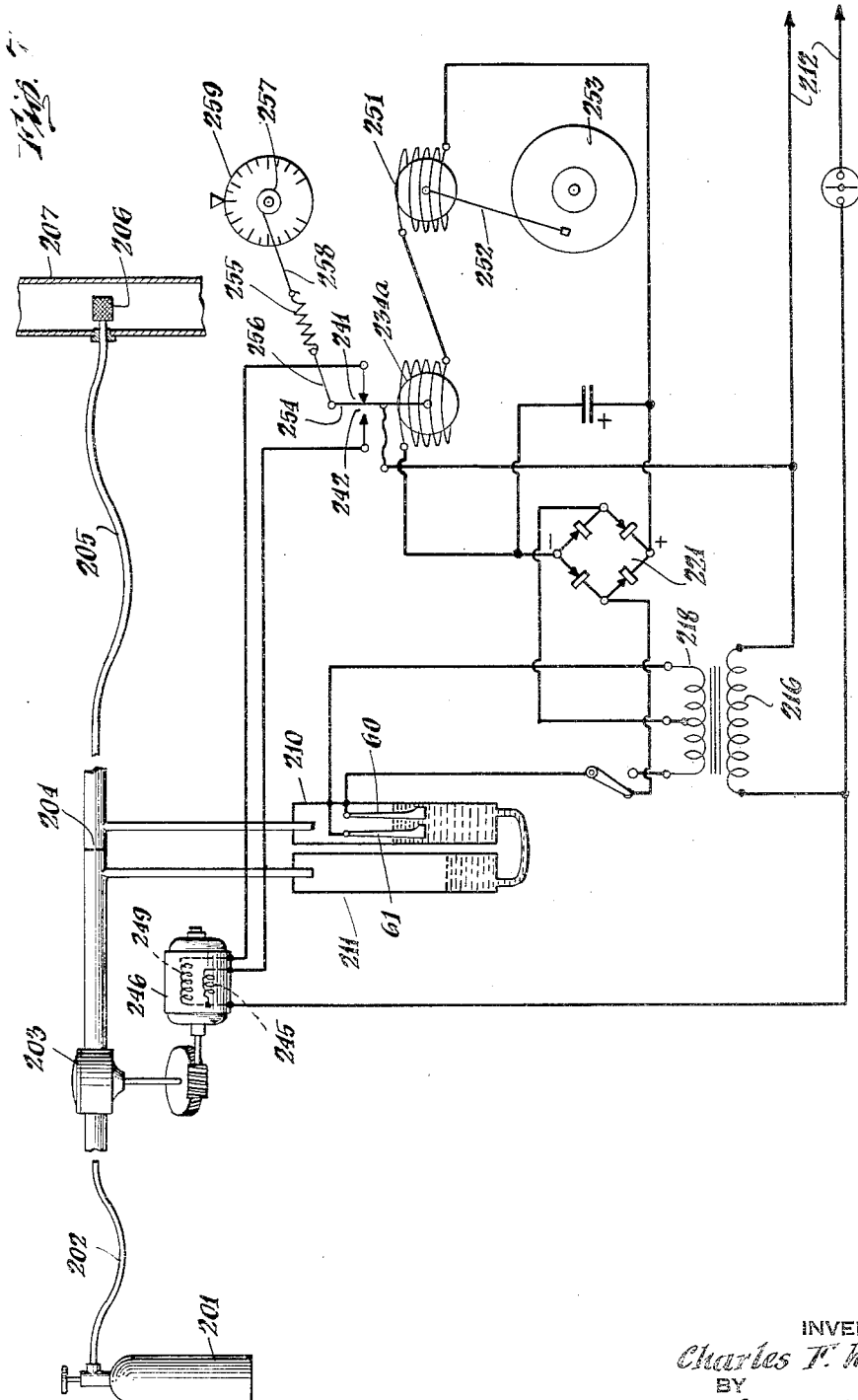

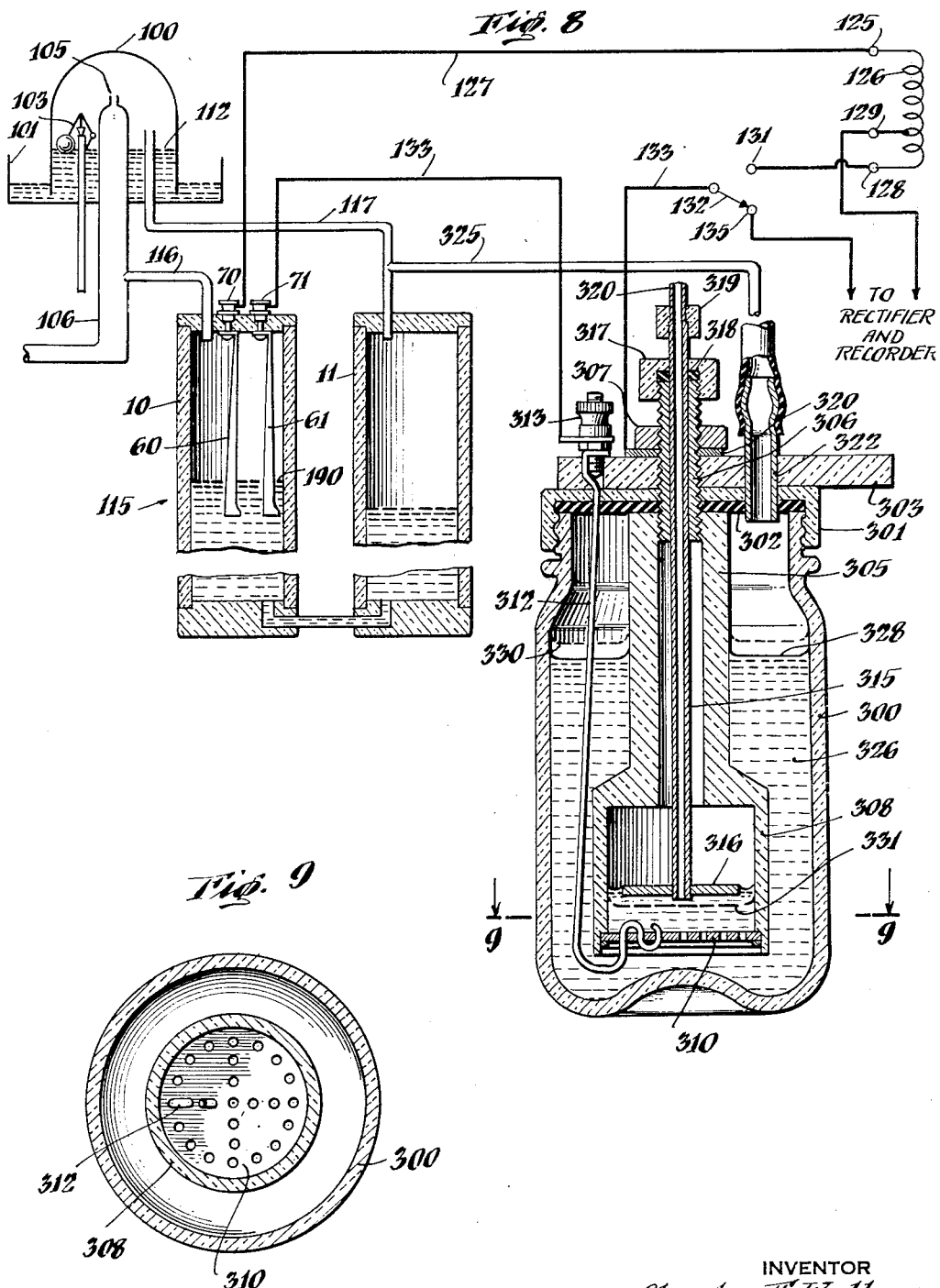

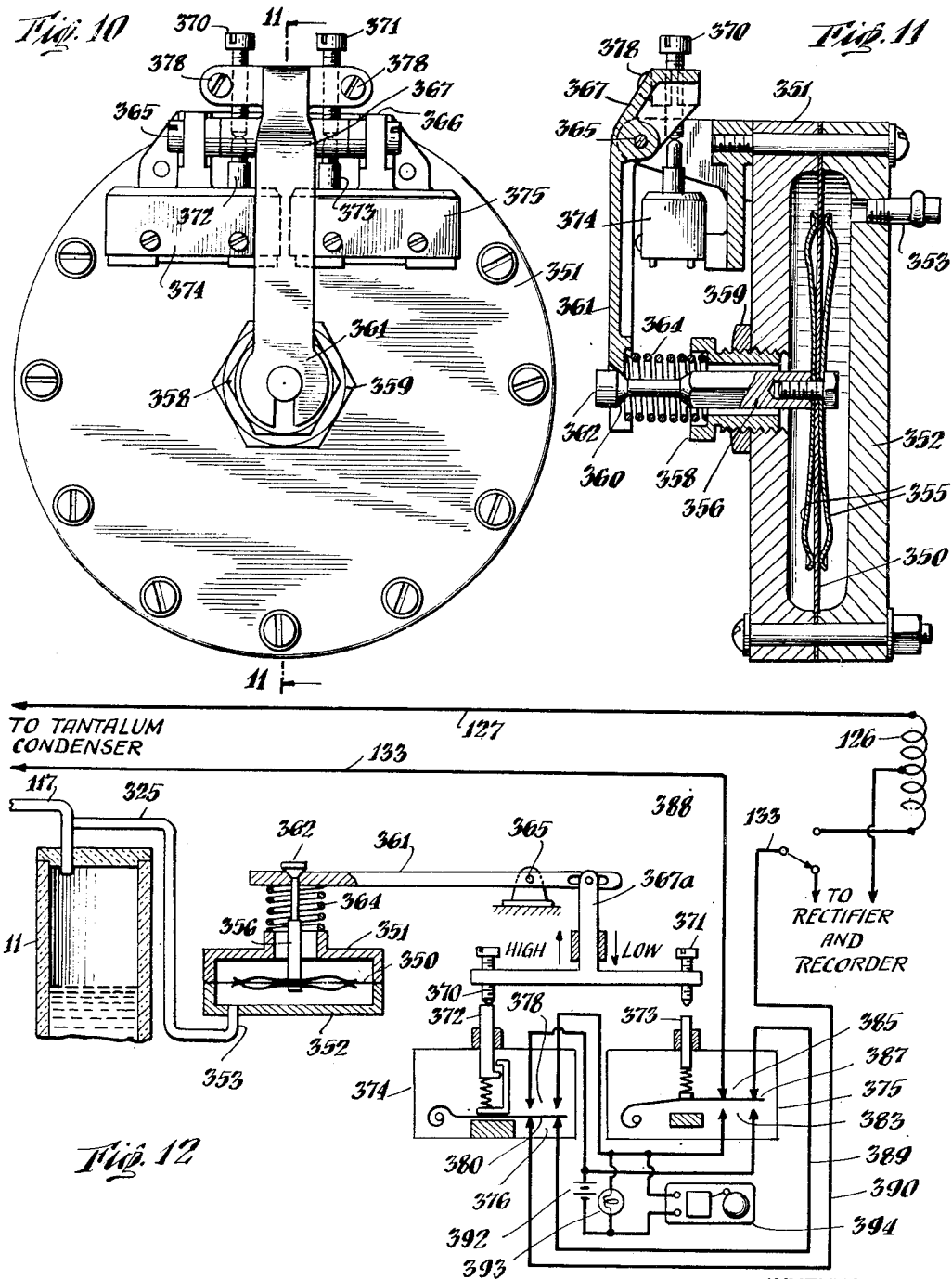

Patented May 1, 1951

2,551,479

UNITED STATES PATENT OFFICE 2,551,479

ELECTRICAL DETECTION AND MEASUREMENT OF FLUID CONDITIONS

Charles F. Wallace, Westfield, N. J., assignor to Wallace & Tiernan Products, Inc., Belleville, N. J., a corporation of New Jersey Application April 22, 1947, Serial No. 742,996

14 Claims. (Cl. 177—311)

This invention relates to the electrical detection and measurement of fluid conditions. In an important specific aspect the invention relates to the measurement, recording and control of the rate of flow or the pressure of a gas, for example as in systems where it is desired to record the rate of flow of a gas being supplied to a point of utilization, or to control such rate to maintain it at a fixed or adjustable value, the gas flow in either case being detected by pressure-sensitive means constructed in accordance with principles hereinbelow disclosed.

A specific instance of the application of the invention in practice is in the operation or control of chlorinating apparatus, viz. devices wherein chlorine gas is supplied continuously for solution in and treatment of an aqueous liquid such as drinking water or sewage. Thus for example, in one particularly satisfactory type of apparatus known as a vacuum chlorinator the gas is maintained and fed to an injector device under pressure lower than atmospheric, i. e. a so-called negative pressure. In its path of flow, the chlorine is conveniently drawn through a metering orifice whereby a pressure drop or difference of negative pressures appears between the opposite sides of the orifice, and the rate of flow may be adjusted by varying the negative pressure, for instance on the output side of the orifice. In the injector device the chlorine gas thus supplied is absorbed in a minor flow of liquid, e. g. water, which in turn discharges into the main or other container for the liquid under treatment.

In the use of such systems for sterilization of public water supplies and for other chlorine treatments involving the health of individuals, it has become important to maintain a continuous record of the operation of the chlorinating system, preferably such as to show the quantity of chlorine being supplied at any given time and thus to make it apparent that a sufficient amount has been fed for the desired result of sterilization or the like.

The problem of detecting and recording the rate of chlorine supply is rendered difficult by the delicate nature of the measurement involved and also by the nature of chlorine gas, in that it is highly corrosive for many metals and its escape is dangerous to personnel. Thus in a vacuum type chlorinator significant changes in the rate of gas flow may correspond to a pressure change, i. e. in the drop across the metering orifice, no larger than a small fraction of an inch of water. In consequence, an instrument responsive to such minute changes must be extremely sensitive, and if permanent records are desired, it should at the same time include translating means capable of operating a recording device of positive and preferably rugged character. Furthermore, the sensitive elements must be unaffected by the corrosive action of chlorine gas, and appropriate sealing means are required to prevent escape of such gas into the instrument or control room, both for the safety of personnel and to avoid corrosive effect on unprotected equipment. A further requirement, difficult to satisfy under the conditions just described, is that the recording instrumentality must often be located in a place remote from the chlorine supplying apparatus itself. All of these requirements, including the last-mentioned, are equally applicable to situations where instruments and connections must be provided for a remote control of the chlorinated apparatus, e. g. as in accordance with certain conditions in the latter.

Accordingly, an important object of the present invention is to provide improved means and methods of detecting, indicating and recording the flow of gas especially under circumstances encountered in the operation of chlorinators or similar equipment as described above. A further object is to provide simplified and yet fully reliable apparatus and procedure of the character stated, for controlling the flow or other condition of a gas, as by detecting its actual rate of flow and making such adjustment as is necessary from time to time, to keep such rate at a predetermined fixed or manually or automatically adjustable value.

Other objects are to provide efficient, sensitive, and economically simple apparatus for detecting changes of pressure or flow of a fluid; to provide an improved manometer structure, particularly involving a reliable but remarkably sensitive electrical arrangement for detecting and transmitting the changes of condition to which the manometer is intended to respond; to provide rugged and highly accurate apparatus for detecting changes of gas pressure or flow, such apparatus preferably being adapted for use with a corrosive gas and also providing an electrical response appropriate for registration at a locality remote from the place of actual test. Another object is the provision of effective and yet extremely sensitive means for detecting changes of liquid level, i. e. changes in the location of an interface between a liquid and another fluid, the detection being preferably such as to afford an electrical response at a place remote from the locality of actual measurement.

Further objects are to provide gas flow measuring systems including improved means for effecting special response of the translating device to failure of gas flow or the like, and also to provide novel pressure-responsive instrumentalities, cooperable with flow-detecting means of the character herein described, for producing significant control operations in electrical circuits upon occurrence of abnormal pressure conditions.

To these and other ends, including objects and advantages hereinafter apparent or otherwise incidental to the new apparatus and procedures, the nature of the invention may be conveniently explained by reference to the following description and accompanying drawings, which set forth by way of example certain presently preferred embodiments.

In the drawings:

Figure 1 is an elevation, with certain portions broken away in vertical section, of a manometer device embodying the principles of the invention;

Fig. 2 is a vertical section on line 2—2 of Fig. 1, with some portions broken away as will be apparent;

Fig. 3 is a horizontal section generally on line 3—3 of Fig. 1 but with certain portions in horizontal section on lines 3a and 3b respectively of Fig. 1;

Fig. 4 is a fragmentary plan view of the device of Figs. 1 to 3;

Fig. 5 is a view, chiefly diagrammatic, of a chlorine flow recording system embodying the invention, certain elements being shown in perspective with parts broken away;

Figs. 6 and 7 are diagrammatic views respectively of two chlorine flow controlling systems incorporating the invention;

Fig. 8 is a partly diagrammatic and fragmentary view of a modification embodied in a system otherwise identical with that of Fig. 5 and including a novel electrolytic switch shown in vertical section;

Fig. 9 is a horizontal section on line 9—9 of the switch of Fig. 8;

Fig. 10 is an elevational view of a novel pressure-responsive limit-switch device;

Fig. 11 is a vertical section on line 11—11 of Fig. 10; and

Fig. 12 is a diagrammatic and fragmentary view of a further modification embodied in a system otherwise identical with that of Fig. 5 and including, but in diagrammatic representation, a switch device of the type of Figs. 10 and 11.

In one embodiment, particularly as hereinafter described in connection with Fig. 5, the system of the invention is incorporated with a vacuum type chlorinator wherein chlorine gas is fed through a so-called metering orifice under vacuum. The difference of pressure or pressure drop across the orifice is representative of the rate of flow and is applied to a manometer of special construction, as below described, to provide an electrical signal or indication representative of change in the pressure drop. This electrical response of the manometer is arranged to actuate or otherwise control a recording instrumentality, such as one of the sensitive but rugged type shown in Fig. 5, so that a continuous chart record is provided, of the rate of chlorine supply by the chlorinator.

Referring to Figs. 1 to 4 inclusive, there is shown a pressure-sensitive device suitable for embodiment in a system of the type described. The illustrated apparatus is essentially a U-tube manometer adapted to contain a liquid and arranged so that the space above the liquid in each leg may be connected to communicate with one side of the locality of the pressure drop to be measured. A pair of vertically disposed parallel glass tubes 10, 11 have their upper ends closed by disks 12, 13 undercut to receive the upper edges of the glass tubing and disposed to be compressively sealed against the latter by gaskets 14 of rubber or the like. Similar closure disks 16, 17 are provided at the lower ends of the tubes 10, 11, to be sealed by like gaskets 18, the compressive engagement of the disks against the gaskets and tubes being obtained by suitable means, such as hereinbelow described.

The tubes 10, 11 are preferably sections of precision bore glass tubing, it being desirable that the changes of liquid level be accurately representative of actual displacement of liquid from one tube to the other. The sealing disks 12, 13, 16 and 17 may be of similarly suitable material, such as Lucite or hard rubber. Horizontally embedded in each of the lower disks 16, 17 is a metallic nipple 20, preferably made of silver or other chlorine-resistant metal when the apparatus is to be used in a system handling corrosive gas such as chlorine. Each nipple 20 communicates with the interior of the glass tube above it by a passage 21, as shown in Figs. 2 and 3, and the nipples are appropriately connected as by the flexible rubber tubing 22, to complete the U-shaped structure constituted with the upright cylinders 10 and 11.

The lower disks 16, 17 are respectively engaged, at their underside, by metal caps 24, 25 of cup-like configuration, having their upper edges seated in undercut recesses around the lower edges of the sealing disks. The caps 24, 25 are held in spaced relation by parallel plates 26 tangentially fastened on the outer surfaces of the caps, and the centers of the plates 26 are secured to the opposite ends of a cross member 28. The latter is in turn fastened on the bottom of an upright bar 30 extending approximately to the top of the device and terminating in a threaded stud-like portion 31 adapted to receive an internally threaded knob 32. Similar but downwardly opening metal caps 34, 35 are respectively disposed at the top of each tubular assembly, the skirts of the metal caps being seated against appropriate shoulders cut in the periphery of the disks 12, 13. A horizontal plate member 36, bowed upwardly at the middle, has its outer ends engaging the upper surfaces respectively of the caps 34, 35 and has a central aperture so that it fits down over the stud portion 31 beneath the knob 32. For better engagement, the undersides of the ends of the plate 36 carry projecting bosses 37, each fitting into a cooperating recess 38 in the center of the upper surface of the corresponding cap.

It will now be seen that when the described parts are assembled and the knob 32 is screwed down, the plate 36 compresses the assembly on each side, i. e. between the plate and the lower structure comprising members 26 and 28, so that the metal caps firmly hold the disks 12, 13, 16 and 17 in sealing relation, through the gaskets 14 and 18, against the respectively corresponding ends of the upright tubes 10 and 11. The entire apparatus may be mounted, as on a suitable panel fragmentarily indicated at 40 (Figs. 2 and 4), by means of studs 41 projecting back from the bar 30. The upper disks 12, 13 are respectively pierced by nipple tubes 42, 43 so that the fluid communication may be had at the top of each leg of the U-tube, connection to the nipples 42, 43 being effected by flexible tubing 44, 45 of rubber or the like.

For purposes presently to be described, the device preferably includes means for making accurate preliminary or corrective adjustment of the liquid level, for example to pre-set the level that corresponds to zero gas flow, in one leg of the U-tube. Thus the lower closure disk 16 of the tube 10 has a small vertical passage 47 communicating with a chamber below the disk, the chamber being enclosed by a horizontal diaphragm 48 of rubber or other flexible material. At its center the diaphragm carries a cylindrical plug-like fitting 50 having an internally threaded recess 51 extending from its lower side, to receive the threaded stem 52 of an adjusting knob 53 secured on the stem, as by a press fit. The stem 52 is rotatable in an appropriate bearing aperture at the center of the lower cap 24 and is prevented from moving axially by having a collar 55 fastened to it, the collar and the knob 53 thus respectively abutting opposite faces of the bottom of the cap as shown. To provide clearance for the fitting 50, the lower side of the disk 16 may be deeply recessed as at 56. When the knob 53 is turned so as to rotate its threaded shank 52 in the diaphragm fitting 50, the latter is correspondingly displaced in a vertical direction. The diaphragm 48 is thus raised or lowered so as to provide small adjustments in the level of liquid, actually in both tubes although chiefly for the sake of the tube 10.

If the U-tube structure is partially filled with a liquid, and if the nipples 42, 43 are appropriately connected to localities of differing gas pressure, the levels of the liquid in the tubes 10 and 11 will differ by an amount corresponding to the pressure difference. If the latter changes, a change of the difference in levels will result and may in fact be measured by the change of level in one leg. Means are therefore provided in the tube 10 for detecting such variations of liquid level and a presently preferred structure of the invention for that purpose comprises a pair of elongated metal plates 60, 61, in this instance actually long strips, as of the configuration shown. The upper ends of the strips are bent over and secured respectively by washers 62, 63 beneath the heads of screws 64, 65 that extend up through the disk 12 and cooperating insulating sleeves 66, 67 and are fastened by nuts 68. The screws also have knurled nuts or the like, as shown, so that the upper assemblies constitute electrical terminals 70, 71 for the plates 60, 61. The nuts 68 are tightened sufficiently to provide good electrical and mechanical connection for the upper ends of the plates, and also to prevent passage of gas around the screws.

At its lower end each of the plates 60, 61 is linked by a wire hook 72 to an insulating member such as a glass ring 73. The rings 73 are engaged by corresponding wire hooks 74 held, so as to exert a downward stress, by the lower end of a vertical rod 75 which has its upper end threaded into the underside of the disk 12. By the instrumentalities just described, the plates 60, 61 are maintained under tension in a desired spaced relation, being pulled downwardly by the hooks 72 and held at the top by the screws 64, 65.

Each of the plates 60, 61 is made of a film-forming metal, i. e. a metal adapted to have formed on its surface an electrolytic film of high dielectric value, as by the action of an electric current passing between such member and an electrolyte in which it may be immersed. Although a number of metals or alloys are known to have the characteristic of forming such a film, I have found that tantalum is a particularly suitable material for the plates 60, 61 in apparatus to be used in the measurement of chlorine flow. A filming metal, e. g. tantalum, should likewise be used for any metallic parts, such as the wire hooks 72, that are in electrical contact with the plates and may be exposed to the same conductive liquid as the latter. Other exposed metal parts that are insulated from the plates, for instance the rod 75 and the hooks 74, need not be film-forming but are preferably of non-corrosive material, e. g. silver, where chlorine gas or solutions containing chlorine are involved.

In further conformity with the present invention, the U-tube structure is partially filled with an electrolytic solution, for instance a 1 per cent solution of sodium chloride, and upon application of a suitable source of alternating electromotive force to the terminals 70, 71 an alternating current flows between the plates through the solution. In accordance with principles known in the art of forming electrolytic films, the surfaces of the electrodes 60, 61 that are exposed to the electrolyte become coated with a film, usually understood to consist of an oxide or hydroxide of the metal, having special dielectric properties. When thus filmed, the electrodes 60, 61 in effect constitute the plates of an electrolytic condenser which is completed by the conductive liquid in the tube 10, e. g. the sodium chloride solution.

To the extent that the level of the liquid changes, the extent of submergence of the plates and in consequence the electrical capacity of the condenser similarly change, and the variations in capacity can be measured electrically to determine variations of the liquid level. In some cases the initial formation of films on the electrodes may be achieved with the tube 10 only partly filled with electrolyte, e. g. with the level well above the lower ends of the plates 60, 61 and at a point relatively high for the normally expected range of operation, automatic forming effects of the operating current being relied on for subsequent filming of still higher plate regions if necessary. A procedure now preferred in practice, however, is to impress the maximum differential vacuum (for instance, equal to 12 inches of water) across the manometer during the forming period, i. e. thus at the outset to form the electrodes throughout the maximum area to which they may be submerged under any condition of use.

It will now be appreciated that the proportions and dimensions of the U-tube structure should be such as to afford the range of response desired under the circumstances of use. Thus in the case of a chlorinator where changes of negative pressure difference may be as much as twelve inches or as small as a fraction of an inch, the tubes may be fairly long, it being understood that in Figs. 1 and 2 they are shown abbreviated as indicated by the broken and dot-and-dash lines 78, 79. For instance, in measuring the flow of a vacuum type chlorinator as below described in connection with Fig. 5, satisfactory results have been had where each of the tubes 10, 11 had an inside diameter of about 2 inches and was about 14 inches long. In such case the electrodes 60, 61 were each 7¼ inches long, so that a space of about 7 inches extended between the bottom edge of each plate and the upper surface of the bottom disk 16.

The plates 60, 61 may have any desired shape, and while useful sesults can be had with plates of a simple rectangular outline, an advantageous feature of the invention is that special configurations may be used to provide practically any desired type of response in the controlled electrical instrumentalities. Thus in the example shown the plates are tapered from a width of, say, ½ inch at their lower extremities to about ⅛ inch at the top, with a concave curve whereby the ultimate readings may bear a desired relationship to variations of rate of gas flow. That is to say, since the device actually responds to changes in pressure difference, which is proportional to the square of the varying rate of flow, the plates can be designed so that in effect the ultimate electrical measurement represents the extraction of the square root of the value of the liquid level. Taking into account the inherent relationship in the selected electrical measuring apparatus (e. g. as in Fig. 5) between the actual readings and the changes of electrical capacity under measurement, and likewise considering the relationship between the capacity of the condenser constituted by the plates 60, 61, and the area of the submerged portions of the latter, it was found that plates bounded by a curve of the sort illustrated permitted the chart to be graduated in a logarithmic scale, which affords uniform percentage of accuracy (as measured by actual pen displacement) throughout the range. The plates need not ordinarily have a large surface area; a condenser of sufficiently great capacity is afforded with electrodes of the dimensions indicated above, since the electrolytic film is extremely thin and at the same time has a high dielectric constant.

The caps 34, 35 over the tube-closing disks 12, 13 have their horizontal faces appropriately apertured as at 80 for passage, with clearance, of the nipples 42, 43 and the terminal sleeves 66, 67.

Fig. 5 shows certain elements of a chlorine supply system, in combination with chlorine flow detecting and recording apparatus embodying the present invention. Although the means for supplying and feeding chlorine gas to its point of solution may be one of a wide variety of types, the selected example embodies the convenient arrangement of a bell jar 100 supported in a water-containing tray 101 so as to enclose a space of reduced pressure, i. e. vacuum. From a source 102 of chlorine gas the latter flows into the space enclosed by the jar through a float-type constant pressure valve 103, and the gas is withdrawn through a so-called metering orifice 105 at the upper end of the meter tube 106, the gas passing down through the meter tube and through a back pressure device 107 to an injector 108 constituted by an appropriate throat or aspirator in a pipe 110 through which water, for example, continually flows. The pipe 110 discharges its contents into the main 111 or other body of liquid to be chlorinated; it will be understood that the contents of the pipe 110 acquire a relatively large concentration of chlorine so that the desired and usually small amount of the latter is incorporated in the flow of the main.

It will be appreciated that in practice other instrumentalities are incorporated in chlorinating equipment of this sort, including various valves and safety devices, and also, if desired, appropriate means for control of the degree of vacuum in the meter tube 106 either manually or for instance in accordance with the rate of flow in the main, so as to control the rate of chlorine feed. For further description of certain embodiments of apparatus of this type, reference may be had to my prior patents, No. 1,762,706, issued June 10, 1930, and Nos. 1,777,986 and 1,777,987, issued October 7, 1930. It will be understood that the desired vacuum or negative pressure in the meter tube 106 is established by the injector or aspirator 108, preferably with the addition of supplemental equipment including the vacuum controlling device 107, not here shown in detail but explained in the above prior patents. By aid of the level of water 112 the float valve 103 tends to maintain a substantially constant degree of vacuum, i. e., a constant subatmospheric pressure, under the bell jar during normal operation and the rate of chlorine flow may be adjusted by varying the negative pressure in the meter tube 106 as stated above, the pressure there being lower than in the space under the bell jar, by an amount which consequently governs the rate of chlorine flow through the orifice 105.

In accordance with the present invention a manometer device, which may be of the type shown in Figs. 1 to 4 inclusive, is incorporated in the system of Fig. 5 as there illustrated in diagrammatic form and identified by the same reference numbers for essential parts. The interior of the tube 10 of the manometer device generally designated 115 is connected by tubing 116 to the interior of the meter tube 106, and the other manometer tube 11 is similarly connected by tubing 117 to the interior of the bell jar 100, so that the spaces at the top of the manometer U-tube respectively communicate with opposite sides of the path of gas flow through the orifice or restriction 105. The high vacuum (lower pressure) side of the orifice is thus connected to the head of the tube 10 which encloses the pair of filmed tantalum plates 60, 61 as described in connection with Figs. 1 to 4. Through their terminals 70, 71 the plates are connected to an electrical circuit responsive to changes in capacity (or impedance) of the condenser constituted by the electrodes and the solution into which they extend.

Although various electrical instrumentalities may be employed for measuring the capacity of the condenser or for detecting change in its capacity, including bridge-type circuits and circuits involving parallel paths of current flow through the electrolytic condenser and through a reference condenser for comparison of the currents by a differential meter or the like, the illustrated circuit is of relatively simple and efficient form and has been found to be satisfactory for measurements in a system of the specific type of Fig. 5. From a source of alternating current (not shown) such as the usual lines supplying 60-cycle 110-volt current at the terminals 120, a master switch 121 can be closed to connect the current supply with conductors 122, 123 to which is connected the primary 124 of a step-down transformer. One terminal 125 of the secondary 126 of the transformer is connected by the conductor 127 to a terminal of the condenser, e. g. the terminal 70. The secondary 126 is conveniently provided with two taps relative to the terminal 125, for instance a tap 128 representing the other end of the entire winding and providing an output voltage of 14 volts, and another tap 129 connected to a lesser number of turns and providing an output of 10 volts (R. M. S. values).

The secondary terminal 128 is connected to one point 131 of a single-pole double-throw switch 132 having its movable arm or contact connected to the other terminal of the condenser, e. g. the terminal 71, by a conductor 133. The transformer secondary terminal 129 and the other switch point 135 of the switch 132 are respectively connected to the input terminals of a bridge-type full-wave rectifier 140, which may be, for example, of the selenium or copper oxide type. The output terminals 141, 142 of the rectifier 140 are in turn connected, by conductors 143 and 144, to the terminals 145, 146 of a galvanometer or meter movement generally designated 150. A fixed condenser 151 of relatively large capacity is also connected across the output terminals of the rectifier as shown; this condenser, which may be of the usual electrolytic type employed in rectifier filters, serves to smooth the pulsating direct current output of the rectifier, so as to avoid vibration or other undesired effects in the meter.

While any appropriately sensitive type of recording electrical instrument may be used, a meter particularly suitable for incorporation in the present system is one that embodies features disclosed in my prior Patent No. 2,341,834, granted February 15, 1944, to which reference may be had for details or modifications not herein described. For convenience of illustration in the present Fig. 5 the instrument is shown in perspective view, somewhat diagrammatically, and with a considerable part of its movement broken away along a vertical plane through its axis of rotation. The device comprises a winding 154 (shown half cut away except for a fragment at 154a) around a spool 155 providing a rectangular hollow core 156 that extends vertically, i. e. along the magnetic axis of the coil. A disk-shaped armature 157 is mounted for rotation within the slot or core 156, about an axis at right angles to the axis of the coil 154, the disk being supported for such mounting by the offset portion 160 of an axle member 161 having a U-shaped configuration as shown and pivoted for the described rotation at points on the legs of the U. The corresponding pivot bearings 162, 163 are respectively mounted in the end plates 164, 165, which also support the winding spool 155 by means of one or more cross pieces such as the member 166.

The armature 157 is preferably a permanent magnet with its axis along a diameter of the disk, i. e. with its poles at opposite edges, and may be made of a material such as Alnico or other metal or alloy having high magnetic retentivity. The front leg of the U-shaped axle structure has a forwardly extending portion 168, carrying at its outer end a dependent arm 169 which supports a pen 170 in marking engagement with a circular cardboard chart 171 that is mounted on a shaft 172 to be driven by a motor mechanism 173, which may be of the electric clock motor type and is energized from the current supply line 120 through conductors 175, 176, and the master switch 121. The other leg of the U-shaped axle structure carries upright and lateral studs 180, 181, with an adjustable balancing weight 182 on the stud 180; these parts serve conjointly for balancing purposes and also to provide a desired character of bias for the rotor assembly, i. e. to a predetermined zero position.

Although the spool 155 may be of insulating material, it is preferably made of copper, brass or other good electrical conductor, for damping effect to reduce undesired oscillation of the rotor.

Certain advantages of various structural features of this recording galvanometer are explained in my cited Patent No. 2,341,834, it being important to note here that the device is highly sensitive and yet of a rugged, simple and foolproof construction, and affords a sufficiently powerful response for positive operation of a recording pen or other mechanical device, usually without the use of a depressor bar or the like.

In operation of the system of Fig. 5, a preliminary step is to fill the U-tube structure 10, 11 to the extent desired, with a suitable conductive fluid such as a 1 per cent solution of sodium chloride or a solution of any of a wide variety of other electrolytes (including in some cases plain water containing chlorine dissolved therein, as obtained simply by running the chlorinator with the U-tube connected). Examples of alternatives for sodium chloride are sulfuric acid and mixtures of sulfuric acid with salts containing no ammonia, it being preferable to avoid electrolytes that are highly reactive with chlorine in systems where the manometer contents are exposed to such gas. The U-tube remaining disconnected from the chlorinator and the level of the liquid 190 in the tube 10 having been filled or otherwise brought to a suitably elevated position for film formations as explained hereinabove, and the switch 132 having been operated to make contact with the point 131 designated "charge," the master switch 121 is closed so that the full 14 volts of the transformer secondary are applied directly across the plates of the manometer condenser. Current is allowed to flow in this circuit for a period, for instance from ½ to 1 hour, sufficient to build up the desired electrolytic film on the submerged surfaces of the plates 60, 61. Although it is possible to film the electrodes at a voltage no greater than that at which they may be operated, the use of a higher forming voltage is of advantage, according to principles known in the art of electrolytic condensers, for example in that films so formed are more lasting and more resistant to adverse effects of line surges or the like.

After the electrodes 60, 61 have been filmed, the switch 132 is moved to its other contact point 135 where a circuit is completed through the electrolytic condenser and the input of the bridge rectifier 140, in series across the transformer secondary terminals 125 and 129, supplying the smaller E. M. F. of say 10 volts. Assuming that the connections are completed between the manometer and the chlorinator, that the latter is set in operation in a normal manner, and that the chart motor 173 is operating to rotate the chart 171 at a suitable rate, say, of one revolution in 24 hours, the apparatus may now perform its intended function of recording continuously the actual chlorine flow to the injector device 108. The flow of alternating current in the circuit of the plates 60, 61 is governed by their capacity, which in turn is determined by the level of the liquid in the tube 10; i. e., the higher the level, the larger the electrical capacity of the condenser, the smaller its impedance and the greater the current in the measuring circuit—and vice versa, if the level falls, so does the current. The position of the recording meter, i. e. its pen 170, varies with the current as supplied through the rectifier, and thus with the chlorine flow as translated by the varying level of the manometer.

It may be noted that at the outset the quantity of electrolyte in the manometer is preferably adjusted so that with zero chlorine flow the level 190 in the tube 10 is at the lower end of the plates 60, 61, i. e. below the upper limit of the small portion 193 that has parallel vertical edges in the electrode structure shown. Most conveniently the zero level is such that the liquid just wets the bottom edges of the plates; if adjustment of level is made when the device is in operation in a circuit such as shown in Fig. 5, this point can be recognized by a slight deflection of the recorder pen when the edges of the plates are first wetted.

Fine adjustment of the liquid level is effected by turning the knob 53, which changes the volume of the U-tube by adjustment of the diaphragm 49; and from time to time during the operation, i. e. over a period of weeks or months, the zero position can be readjusted by the same means, to take care of variations such as change in quantity of the liquid due to evaporation.

As already explained, the difference in levels in the tubes 10, 11 and thus the actual level in the tube 10 will vary with changes of pressure drop across the orifice 105, which in turn represent variations in gas flow; and since the tube 10 communicates with the output, i. e. lower pressure side of the orifice, rise and fall of the electrolyte in that tube correspond respectively to increase and decrease of flow. In the circuit of the transformer secondary, alternating current flows through the electrolytic condenser having electrodes 60, 61, and in series, as rectified by the rectifier 140, through the winding 154 of the recording galvanometer. The rotor 157 of the latter will adopt a position dependent upon the flow of current through the winding, and the pen 170 will therefore occupy a place, radially of the chart 171, that is determined by the current in the circuit of the level measuring condenser.

Above the liquid in the tube 10 the plates 60, 61 are so far separated by air that being of relatively small area they have no more than an insignificant electrical capacity; but the films on their submerged surfaces are fully exposed to the conductive liquid between them, so that the plates are electrically separated only by the dielectric film material. In fact, since each film is in effect conductive in one direction (when the electrolyte is positive relative to the filmed plate), there is actually only a single dielectric film between conductors in the condenser on each half cycle of the alternating current, and by virtue of all these factors, the electrical capacity of the condenser thus constituted by the plate portions in the electrolyte is very high relative to the submerged plate area.

Assuming that for a particular rate of chlorine flow the manometer levels and the controlled electrical instrumentalities have taken positions as shown, a rise in the rate of flow produces a rise in the level of electrolyte in the tube 10. The submerged plate area is increased, and thus the capacity of the condenser; the impedance in the electrical circuit is correspondingly reduced and a greater amount of current flows, causing the galvanometer to shift the pen 170 across the chart, for example outwardly from the shaft 172 if the galvanometer has been so poled or connected as to provide a zero flow circle near the center of the chart. If the flow of chlorine decreases, the difference of pressure between the inside of the meter tube and the inside of the bell jar likewise decreases and the liquid level 190 falls. The capacity of the measuring condenser is reduced, its impedance increases, and less current flows in the circuit, so that the pen 170 moves back to a lower position. Thus the recorder faithfully indicates the changes in current occasioned by changes of the level 190 in the manometer, and a continuous record of the actual rate of chlorine flow is provided, by efficient, reliable and yet essentially simple instrumentalities.

In Fig. 6 there is shown a system wherein control of apparatus supplying gas such as chlorine may be effected by means and methods embodying the present invention. In this example of such a system chlorine gas is supplied from a cylinder 201 through a conduit 202 and in succession through a throttling valve 203 and a calibrated orifice 204. The conduit continues through a section thereof designated 205 and terminates in a chlorine gas diffuser 206 within a water main 207, the portion of the conduit 202—205 which includes the valve and orifice being enlarged in the drawing for clarity of illustration. Although other means may be employed for effecting mixture of chlorine into the water, a suitable diffuser is one of the type disclosed and claimed in United States Patent No. 1,942,659, granted January 9, 1934, to William J. Orchard, to which reference may be had for appropriate structural details, it being understood that the purpose of the diffuser 206 is to incorporate a small continuous flow of chlorine gas in a large body of liquid in the main 207.

Across the orifice 204 there is connected a manometer device, for example of the type shown in Figs. 1 to 4 inclusive, and embodying vertical tubes 210, 211 connected to form a U-tube arrangement and having filmed tantalum electrodes 60, 61 suspended in the leg 210 so that they are submerged to a greater or less degree in the electrolyte, all as hereinabove explained. The connection of the U-tube across the orifice is similar to the arrangement in Fig. 5 relative to the orifice 105, the tube 210 being in communication with the lower pressure side. The manometer functions in a manner similar to that in Fig. 5; as the rate of chlorine flow through the conduit 202—205 changes, the pressure drop across the orifice 204 correspondingly varies, and likewise the levels in the legs of the U-tube, so that the level in the tube 210 rises and falls with increase and decrease of chlorine flow respectively, to provide corresponding variation in capacity of the electrolytic condenser.

Alternating current from a suitable supply indicated by the terminals 212, e. g. the usual 110-volt 60-cycle line, is connected, when the master switch 213 is closed, to an autotransformer 215, the secondary connection of the autotransformer including an adjustable contact or tap 214 so that a correspondingly adjustable, alternating E. M. F. is supplied to the primary 216 of a step-down transformer 217. The circuit of the secondary 218 is similar in many respects to the circuit of the transformer secondary 126 in Fig. 5 and as explained in connection with the last-mentioned embodiment, a switch 219 is provided to connect the tantalum electrode plates across the full voltage, say 14 volts, of the transformer secondary, or to connect the plates, in series with other instrumentalities, across a portion of the secondary providing a somewhat lower voltage, for example 10 volts. With the switch 219 in the last-mentioned position as shown, alternating current flows in the lower voltage circuit of the secondary 218, comprising the conductor 220, the input terminals of a full-wave bridge type rectifier 221, the conductor 222, the switch 219, the conductor 223, the measuring condenser comprising plates 60, 61, and the conductor 224. As in Fig. 5, the described circuit is employed during operation of the apparatus; for preliminarily forming films on the tantalum electrodes the switch 219 is thrown to its other position, so that the electrodes are connected directly across the higher voltage terminals of the transformer secondary 218 through the conductors 225—223 and 224.

The output of the rectifier 221 is incorporated in a circuit extending from the output terminal 226 of the rectifier through a conductor 227, through a resistor 228 of a potentiometer or voltage divider, and then through a conductor 229 back to the other rectifier output terminal 230. For smoothing purposes, as in Fig. 5, the output of the rectifier is bridged by a condenser 233. Across an adjustable portion of the resistor 228, specifically between one end of the latter and a movable contact arm 235, there is connected a winding of a galvanometer type relay generally designated 234. Thus, according to the adjustment of the arm 235 of the potentiometer type resistance, a selected fraction of the voltage drop across the resistor 228 is applied to the winding of the relay 234, or by the same token, a selected portion of the current in the rectifier circuit flows through the relay winding. Actually, as explained in connection with Fig. 5, this is the same current that flows through the electrolytic condenser constituted by the plates 60, 61, except that it is converted to direct current by the rectifier.

Means are conveniently provided for adjusting the arm 235 of the potentiometer in accordance with changes in the requirement of chlorine supply, for example in accordance with changes of rate of flow of water in the main 207. Thus the latter may include a venturi 236 providing a pressure drop to actuate a flow meter 237, which may be of conventional type and is connected by conduits 238, 239 to regions of high and low pressure respectively at the Venturi structure 236. The meter 237 converts changes of flow into displacements of its shaft 240, which is mechanically coupled, as indicated by the dotted line, to the potentiometer arm 235, so that the latter is adjusted in accordance with variations of water flow in the main 207.

The relay 234, which may be of any suitably sensitive type but can conveniently embody an open core winding and a permanent magnet, disk-type armature similar to the galvanometer arrangement 150 shown in Fig. 5, is adapted to selectively close a circuit to one or the other of two contacts 241, 242 upon slight displacement of the relay armature in one direction or the other from a predetermined position of normal energization. The contacts 241, 242 are adapted to close circuits for flow-adjusting operations of the throttle valve 203; for example if the central arm of the relay engages contact 241, a circuit is closed from one side of the A. C. line 212 (across the autotransformer 215), through conductor 243, contact 241, conductor 244, one winding 245 of a reversible electric motor 246 mechanically connected to adjust the valve 203, and then through conductor 247 back to the other side of the A. C. line. Likewise if the relay arm moves into engagement with the contact 242 a circuit is similarly closed from the A. C. line through conductor 243, contact 242, conductor 248, and the other winding 249 of the motor 246, from which the return path extends through conductor 247 to the other side of the alternating current supply.

For manual control of the chlorine dosage as hereinbelow explained, the voltage on the transformer primary 216 is changed by adjusting the variable contact 214 of the autotransformer 215, as by means of an appropriate knob 250 which may carry a suitable dial as shown.

Assuming that the tantalum electrodes 60, 61 have been appropriately filmed, and that the apparatus is set in operation for supply of chlorine to the main 207 with the master switch 213 closed and the switch 219 in its operating position as illustrated, the function of the manometer device and its associated circuit including the rectifier is conveniently identical with that of corresponding elements in Fig. 5, so that a current flows through the resistance 228, and proportionally through the winding of the relay 234, in accordance with the flow of chlorine gas in the conduit 202—205. Assuming further that the system is in equilibrium, i. e. that no circuit is closed to either of the contacts 241, 242 of the relay, a change in water flow in the main may occur which will require adjustment of the rate of chlorine supply. For example, if the water flow increases, the flow meter shaft 240 correspondingly turns, and the arm 235 of the potentiometer device is adjusted in a direction to reduce the current flow through the winding of the relay 234, i. e. the arm 235 moves clockwise in the illustrated arrangement.

As a result of decreased energization of the relay, one pair of contacts is closed, so as to effect adjustment of the valve 203 in a direction to increase the chlorine feed. For example let it be assumed that the relay connection and the arrangement of the motor windings are such that the circuit from the conductor 243 is now closed to the contact 241 and the consequent energization of the motor winding 245 causes the motor to run in the appropriate direction to adjust the valve toward a more open position. As a result the flow of chlorine in the supply conduit 202, 205 increases and the level of liquid in the manometer tube 219 rises, and since the capacitive reactance, and hence the impedance in the control circuit is thereby reduced, a greater current flows through the resistance 228 and the winding of the relay 234. Actually, the current will be increasing as the valve 203 is being adjusted, and when the current through the relay winding reaches a point where the energization of the latter is equal to its original or normal energization, i. e. that which it had before the change in position of the arm 235, the contact arm of the relay will return to its normal, free position opening the motor circuit and interrupting adjustment of the valve 203. Thereafter the system will continue to supply chlorine at the greater rate, so long as the flow in the main 207 continues at the increased value.

If the water flow decreases, the apparatus operates in a reverse manner, in that the Venturi motor shaft 240 thus turns the potentiometer arm 235 in an opposite direction, i. e. counterclockwise as shown, so as to increase the energization of the relay winding. Under such circumstances the other contact 242 of the relay is closed in the circuit of conductor 243, so that the other or reverse winding 249 of the motor is energized. In consequence the valve 203 is adjusted in the opposite direction. The resulting decrease of chlorine flow causes the current to fall in the control circuit, reducing the energization of the relay winding until it reaches the normal or equilibrium value, whereupon the relay arm returns to its central, open position, and the motor 246 is arrested. Thus the rate of chlorine supply is automatically controlled in accordance with variations of an independent factor or condition, e. g. the rate of flow in the water main to which the chlorine is fed.

Inasmuch as the so-called demand of the water for chlorine treatment may vary seasonally or at shorter intervals, means are provided for desired adjustment of the amount of chlorine that is introduced for any given rate of water flow. Such adjustment, conveniently described as a dosage control, is afforded by the knob 259, which varies the voltage applied to the primary of the transformer 217, and consequently the voltage developed in the part of its secondary that is connected for energization of the control circuit. The dial accompanying the knob 259 may be appropriately graduated in amount of chlorine to be fed per unit quantity of water in the main, e. g. in parts per million.

For example, if it is desired to increase the rate of chlorine flow although the actual rate of water flow has not changed, the knob 259 is adjusted to a lower voltage position. During such adjustment, the E. M. F. applied to the control circuit drops, decreasing the energization of the relay winding, whereupon a circuit is closed through contact 241, energizing the motor winding 245 so as to move the throttle valve 203 toward a more open position. When the chlorine flow has increased to a point where by virtue of the higher level in the manometer tube 210 and because of the correspondingly reduced impedance of the electrolytic condenser, the energization of the relay winding has been restored to its equilibrium value, the relay contact arm returns to its normal mid-point, and energization of the motor is interrupted. Thereafter chlorine supply continues at the increased rate. If, on the other hand, it is desired to reduce the chlorine dosage, the knob 259 is turned in the opposite direction, reversing the sequence of events just explained, whereby the throttle valve is adjusted to a more closed position and the galvanometer relay, after having first moved to close the circuit through the contact 242, is restored to its normal position where the chlorine flow is maintained at the desired lower rate.

It will also be noted that if for any extraneous reason the chlorine flow changes in the conduit 202—205, the apparatus will operate automatically to restore the flow to its intended proportionality (as governed by the flow meter 237 and the dosage control device) by appropriate adjustment of the valve 203. For instance if the chlorine flow increases, there will be a corresponding direct increase in the energization of the relay 234, whereupon a circuit is closed through the contact 242 and the motor winding 249 is energized so as to adjust the valve 203 toward closed position until equilibrium is reestablished. A reverse sequence of events occurs if the chlorine flow should undesirably fall in the supply line.

The described apparatus therefore provides an effectively automatic system for control of the feed of a gas such as chlorine to a locality of use, such as a water main, where there may be occasion for changes in the supply of chlorine as by changes of rate of flow of water in the main, or as by changes of chlorine demand, i. e. the amount of chlorine needed per unit volume of water for the desired purification. The response of the system is rapid and accurate, and the electrical instrumentalities are relatively simple and rugged, yet effectively sensitive, the entire control being through the instrumentality of the manometer device 210—211 embodying the electrolytic condenser arrangement. It may be noted that the E. M. F. applied to the sensitive relay 234 is proportional both to the flow of gas through the orifice 204 and the flow of water through the main 207, and is secondarily proportioned by the setting of the dosage control device 250—214, whereby the desired proportionality and relationship among these factors are automatically maintained at all times.

In Fig. 7 another embodiment of a control system is illustrated, wherein chlorine gas may be supplied to a water main and wherein provision is made for automatically recording the flow of the applied gas and for automatically maintaining such flow at a predeterminable value, but wherein the setting or adjustment of the rate of feed is effected manually. A number of the instrumentalities in Fig. 7 are conveniently identical with corresponding elements in Fig. 6 or Fig. 5 and are therefore marked with identical reference numbers. In the arrangement of Fig. 7, in lieu of the potentiometer resistance 228 of Fig. 6 or the single meter winding 154 of Fig. 5, there are included the winding of a relay 234a and the winding of a galvanometer recorder 251, these windings being connected in series across the output of the full wave, bridge rectifier 221. The relay may be of the same type as is described in connection with Fig. 6 and the recorder of a type similar to that illustrated at 150 in Fig. 5. By virtue of the series connection, both of these devices are responsive to the direct current delivered between the rectifier terminals, and thus in effect to the current flowing through the electrolytic condenser.

As in Fig. 5 the galvanometer 251 is adapted to position a pen arm 252 on a rotating chart 253, providing a permanent record of the chlorine flow in the manner hereinbelow explained. The contact arm 254 of the relay 234a is adapted for selective engagement with one or the other of the contacts 241, 242, for correspondingly selective control of the reversible motor 246, but the relay arm 254 is restricted or affected in its movement by the action of a calibrated spring 255, which has one end anchored to the arm 254 by a cord or filament 256, and its other end connected to a drum 257 by a cord 258, the further end of the cord 258 being fastened to a point on the surface of the drum so that the cord may be wound around the latter to a greater or less degree. The extent to which the cord is thus wound about the drum may be adjusted by a suitable manually rotatable dial 259, which affords (as explained below) a control of dosage or rate of chlorine flow and which may therefore be graduated in P. P. M. or other appropriate units.

From the foregoing it will become apparent that by rotatably adjusting the dial 259 the amount of current necessary both for normal positioning and for counterclockwise displacement of the relay arm 254 can be varied, and in consequence the position of the level or the extent of rise of level of liquid in the manometer tube 210, respectively necessary for such positioning or displacement of the relay arm, may be adjusted. That is to say, the extent of energization necessary for the normal or equilibrium position (as explained for Fig. 6) of the relay arm 254, may be adjusted by changing the tension of the spring 255, through the instrumentality of the manually operable drum and dial arrangement 257—259. At any given setting of the dial 259, the apparatus functions to maintain the chlorine flow at a constant value, in exactly the same manner as is described in connection with Fig. 6.

For instance, upon a departure of such flow from the intended value in either direction, the energization of the relay changes and a circuit is closed through one or the other of the contacts 241, 242, with resulting energization of the motor 246 and adjustment of the valve 203 in an appropriate direction to restore the chlorine flow to the intended value. If it is desired to change the rate of chlorine flow, the dial 259 is turned to a new position as indicated by its graduations, modifying the tension of the spring 255. The energization of the relay no longer balances the spring tension, and a circuit is closed through one or the other of the relay contacts (depending upon the direction of adjustment of the knob 259) so as to move the valve 203 to a new position establishing the chlorine flow at the new desired rate, i. e. where the resulting relay energization is sufficiently greater or smaller to balance the changed tension of the spring.

Since the actual current flow in the control circuit and through the relay winding is determined only by the level of the liquid in the tube 210 of the manometer, and since the latter is governed solely and directly by the actual chlorine flow, and since further, the winding of the galvanometer 251 is connected in series with the relay winding so that it receives the same current at all times, the movements of the galvanometer recorder will correspond strictly to changes in chlorine flow. Thus an accurate record is maintained of the chlorine flow, including all changes whether occasioned by adjustment of the dosage control dial 259 or otherwise. With these and other features as described above, it will be seen that in Fig. 7 a simple and effective control circuit has again been provided, which is easy to operate and is at the same time both reliable and sensitive.

An important advantage of the electrolytic condenser arrangement of the present invention for response to a variable level of the conductive liquid (meaning, unless otherwise specified, relative movability between the electrode structure, and a level, i. e. any boundary, of the conductive liquid with respect to another fluid) is that an extremely high capacitance can be provided with relatively small plate area, for example, the total capacity of the condenser constituted by the above described examples of the plates 60, 61 when the tube 10 is filled with salt solution is about seven mfd. In consequence very satisfactory results can be had when low frequency alternating current is used in the condenser circuit, i. e. frequencies below 150 cycles, which may be defined as commercial frequencies and which include the common values of 60, 50 and 25 cycles. Thus in the described example of Figs. 1-5, using a 60 cycle supply, a current of 25 milliamperes (D. C.) passed through the galvanometer winding (which had a resistance of 168 ohms) when the electrodes were submerged for six inches, and level changes as small as 0.01 inch could be readily detected, especially at the low end of the scale. Although, among a variety of possible modifications of the invention, useful results may be obtainable in some cases where only one filmed electrode or anode is used and where the capacity-responsive connections would then preferably be such as to keep the electrode at a positive potential with respect to the electrolyte and to the cathode or other electrode therein, the illustrated arrangement of two filmed electrodes has been found to be thoroughly satisfactory and reliable, and at the same time permits a convenient simplicity of the measuring circuit.

In many systems, especially for recording the flow of chlorine in water purification installations where the interest of health demands prompt attention to any defect in operation, it is desirable to provide special indication and record of a failure of chlorine supply. Accordingly Fig. 8 illustrates a system which is otherwise identical with that of Fig. 5 and in which identical reference numbers designate the same elements, but which includes a pressure-responsive switching device operative to open the circuit of the filmed tantalum electrode condenser when the pressure under the bell jar 100 changes in a manner indicating failure of the supply of chlorine gas normally introduced through the float valve 103. It may be explained that if the supply of gas becomes exhausted, its flow through the orifice 105 ceases and the drop across the latter tends to fall to zero, i. e. the pressure falls, in the space under the bell jar. Although the vacuum there might presumably rise until it equals that in the meter tube 106, causing the recorder 150 (Fig. 5) to register zero flow, apparatus of this so-called vacuum type usually includes means (not here shown) responsive to a small rise of vacuum under the bell jar, for introducing air instead of chlorine gas, i. e., to prevent further increase of the vacuum and any derangement of the equipment by reason of undue rise of the water level. As a result, air is drawn through the orifice and the translating device continues to record a flow, as if of the intended gas.

For such apparatus it is therefore very desirable to make the recorder read zero flow—or even to assume a sub-zero reading—when the chlorine is exhausted; indeed, even if there is no provision for the substitution of air in the feed line, supplemental means are useful to afford positive assurance of a zero or abnormal reading, preferably effected in a relatively sudden manner to enhance its significance.

The switching device shown in Figs. 8 and 9 comprises a glass container 300 on which is threaded an insulating cap 301 in sealed relation by means of a rubber gasket 302, the cap carrying a terminal plate 303 of insulating material. A tubular baffle 305 of Lucite or other insulating composition is mounted to extend down into the container, by a bushing 306 which is threaded into the central passage of the baffle, traverses the cap and the plate 303, and is secured by a nut 307 that thus clamps the upper end of the baffle in sealed engagement with the gasket 302. The lower end of the baffle has an enlarged portion 308, like an inverted cup, which supports at its bottom edge a perforated, disk-shaped electrode 310 of suitable material, e. g. silver where the device is used with chlorine supply apparatus. A connecting wire 312, which may also be of silver, extends from the electrode 310 to a terminal 313 carried by the plate 303. A long, slender tube 315 extends, with a sliding fit, down through the bushing 306, and at its lower end centrally supports another disk-shaped electrode 316 within the enlarged baffle portion 308, the bottom edge of the tube projecting very slightly, say $\frac{1}{32}$ inch or less, below the electrode, and the electrode and tube being both made of non-deteriorating material, such as silver.

The tube 315 can be moved vertically to adjust the level of the electrode 316, and can be locked in any adjusted position by a nut 317, of Lucite or the like, threaded on the upper end of the bushing 306 and enclosing suitable packing material 318. A knob 319, fitted over a reduced extension 320 of the tube 315, facilitates manual adjustment of the latter. Electrical connection to the electrode 320 may be made with a terminal strap clamped under the nut 307, and a tubular nipple 322 extends through the plate 303 and the sealed cap 301 into the region outside of the baffle 305 so that connection can be made with a source of pressure (e. g. vacuum or negative pressure), for the desired response to changes of such pressure.

By way of example, the device is shown electrically connected in series in the circuit between the measuring condenser 60, 61 and the recording meter (see Fig. 5), e. g. by interrupting the conductor 133 and connecting the two parts of the latter respectively to the terminals 313, 320. A conduit 325 extends from the nipple 322 to communicate with the interior of the bell jar 100, conveniently as a branch from the conduit 117; the tube 315 opens to the atmosphere. For operation the container 300 may be partly filled with an electrolytically conductive liquid 326, such as a saturated aqueous solution of sodium chloride or other electrolyte for example as mentioned hereinabove for the manometer 10, 11. Normally, the negative pressure under the bell jar 100 is kept at a very constant value (by the float valve) regardless of changes of the rate of gas feed, for instance at a value equal to two inches of water, and the amount of electrolyte in the container 300 should be such that when the communicated vacuum elevates the liquid level 328 outside the baffle by a corresponding distance, the level under the cup portion 308 is well between the top and bottom thereof.

Assuming that the chlorine supply equipment is functioning and that the electrical circuit is otherwise connected for operation, a convenient preliminary step is first to raise the tube 315, i. e. clear of the liquid 326, to insure (for accuracy of later adjustment) that the pressure under the baffle is at least approximately atmospheric; thereupon the tube may be lowered and locked in place with the electrode 316 submerged, preferably just submerged or partly submerged, as shown. By virtue of the high conductivity of the cell thus constituted, the control circuit for the recorder then operates in its intended fashion as hereinabove described, so long as there is no appreciable drop in the pressure under the bell jar; but if the chlorine supply to the valve 103 is interrupted, the vacuum rises under the bell jar and in the space around the baffle, causing the level 328 to rise, say to the dotted line position 330. The level in the tube 315 correspondingly falls, in fact to a point below the end of the tube, and hence, necessarily, the entire liquid level within the baffle drops to the dotted line position 331. The electrode 316 is therefore free of the electrolyte so that the circuit through the cell is effectively broken, interrupting the flow of current through the recording meter and immediately causing the pen to move to a zero or abnormal position. Although the rise of vacuum under the bell jar may only be ¼ inch before it is arrested by admission of air as explained hereinabove, this change is fully sufficient for effective operation of the electrolytic switch, which will keep the circuit open and keep the recorder at zero indication until the pressure under the jar is restored to normal by reinstatement of gas supply.

Thus the device shown, i. e. an electrolytic switch embodied in a U-tube structure having concentric legs, provides the desired prompt indication of chlorine failure. It will be noted that the electrode arrangement 315—316 is spaced from the baffle over a relatively long distance above the liquid, so that the conductivity of any leakage path along the baffle is negligible, even though the latter becomes encrusted with salt. Although in some cases the space surrounding the tube 315 may open directly to the atmosphere, the structure shown is fully effective for most purposes: when the liquid level in the tube tends to fall below the end of the tube, so must the entire level within the baffle, under the kind of circumstances here contemplated. Moreover, keeping the end of the tube below the liquid during normal operation minimizes any escape of chlorine gas that might be released from solution in the electrolyte and that would be undesirable both for attending personnel and for other nearby equipment.

It will be understood that in any of these systems, e. g. Fig. 5 or Fig. 8, manual shut-off may be provided, for instance by turning the switch arm 132 to a non-contact position, whereupon the recorder pen will move to the zero indication.

Figs. 10, 11 and 12 illustrate another form of switch designed for the same type of response, both on failure of chlorine supply and on failure of the vacuum maintained at the outlet end of the gas feed line, provision being also made for operation of an alarm device in either event. Referring particularly to Figs. 10 and 11 a flexible diaphragm 350 of rubber or the like is peripherally clamped between two dished members 351, 352, the latter cooperating with the diaphragm to constitute an expansible chamber and having an opening through a tubular nipple 353. The central area of the diaphragm is braced by a pair of circular spring plates 355 on respectively opposite sides, the assembly being centrally clamped together and to a connecting stud 356 which passes freely through a bushing 358 that is threaded into the face of the member 351 and that has a nut 359 for locking it in any adjusted position. The stud 356 passes through a countersunk opening 360 at one end of the long arm of a lever 361, and has an enlarged head 362 seated in the opening. A coil spring 364 is disposed under compression between the lever and the bushing 358.

At an upper portion the lever is pivoted or fulcrumed on a horizontal axis 365 to a bracket structure 366 mounted on the assembly 351—352, and beyond the pivot axis has a T-shaped, short arm 367 extending at an obtuse angle, e. g. 130°, to the long arm. A pair of screws 370, 371 are threaded vertically through respectively opposite ends of the head of the T-arm 367, in position to engage the corresponding plungers 372, 373 of a pair of snap-action micro-switches 374, 375. It will be understood that each of the switches may be of a known type of construction, having contacts or circuit-controlling elements spring-biased (with the plunger) into one position, and shiftable into another position upon but only during appropriate depression of the plunger. The individual operating point for each plunger screw 370 or 371 may be adjusted by screwing it up or down, means being provided including a slotted construction of each end of the T-head and a cooperating clamping screw 378, for locking the plunger screw in adjusted position. It will be appreciated that if the chamber of member 352 is connected to a source of vacuum such as the bell jar 100 (of Figs. 5 and 8), a rise of vacuum will pull the stud 355 to the right, as seen in Fig. 11, against the spring 364 and thus rock the lever counterclockwise, while a decrease of vacuum will permit the spring to return the stud and lever in the reverse direction. The over-all operating point, or the amount of vacuum necessary to effect a predetermined displacement of the lever, may be adjusted by screwing the bushing 358 in or out.

As will also become apparent from the diagrammatic illustration of Fig. 12, the switches and parts are so adjusted that: (a) when the diaphragm is at a predetermined extreme inward (high vacuum) position and then departs from such position by movement to the left as seen in Fig. 11, the screw 370 depresses the plunger 372 of the switch 374 to effect a shift of its contact elements, the plunger being then held depressed even though the diaphragm travels (leftward, Fig. 11) to its predetermined extreme outward or low vacuum position; and (b) the plunger 373 of the switch 375 is only depressed by the screw 371, to shift the corresponding contact elements, when and if the diaphragm reaches the extreme outward position. The overtravel in the described operation of the plunger screw 370 is taken up by the spring action of the plunger; but the lengths of the lever arms are such that an appreciable displacement of the diaphragm 350 produces only a very small vertical movement of the screw 370 and plunger 372, thus readily permitting the described overtravel to an extent compatible with the limited spring action or freedom in commercially available switches of the described type.

Fig. 12 shows a portion of a chlorine flow detecting and recording system otherwise the same as that of Figs. 5 and 8, similar parts being identically numbered and further identical parts being omitted for simplicity of illustration. The device of Figs. 10 and 11 is shown in an expanded or diagrammatic form, with like reference characters except that the short T-arm structure of the lever, although generally the same in function, is designated 367a. The chamber of member 352 is connected through the branch conduit 325 and conduit 117 to the bell jar 100 (see Fig. 8). The high limit switch 374 has a lower pair of contacts 376, an upper pair of contacts 378 and a shorting bar 380 spring mounted to short the upper contacts 378 unless depressed (to short the lower contacts) by the spring mounted lower member of the plunger assembly 372, the spring of the bar 380 being also adapted to carry up the plunger assembly when pressure of the screw 370 is released. The low limit switch 375 also has lower and upper pairs of contacts 383, 385 and a similarly-functioning spring-mounted shorting bar 387. The lower contacts 376 of the high limit switch and the upper contacts 385 of the low limit switch are connected in series in the circuit of the recording meter, i. e. from one part of conductor 133, through conductor 388, contacts 385, conductor 389, contacts 380, and conductor 390 back to the other part of conductor 133. The other sets of contact 378, 383 are connected in parallel and alternatively adapted to close an alarm circuit, such as the circuit shown including a battery 392 and one or more alarm devices, for example a lamp 393 and a bell 394.

During normal operation of the chlorine supply equipment, both contact sets 376 and 385 are closed as shown, completing the recorder circuit. If the chlorine supply fails, the vacuum under the bell jar rises, the diaphragm 350 moves inward to its high limit, and the screw 370 releases the plunger 372. As a result the bar 380 moves away from the contacts 376, opening the recorder circuit and compelling a zero reading, and closes the contacts 378 to energize the alarm devices. If the vacuum in the chlorine feeding system fails because of failure of water supply to the aspirator 108 (Fig. 5) or for any other reason, the vacuum under the bell jar decreases and the diaphragm moves outward to its low limit. Although the "normal" position of the switch 374 is not then affected, the screw 371 depresses the plunger 373, shifting the shorting bar 387 from contacts 385 to contacts 383. The recorder circuit is consequently opened and the alarm circuit closed. Thus in either type of failure, represented by a correspondingly higher or lower vacuum, the control of the translating instrumentality is promptly modified to give a zero reading, and an alarm is operated, to announce the abnormal conditions.

It will be appreciated that in actual practice a system of the sort shown in Fig. 6 or Fig. 7 preferably includes a back pressure valve (not shown) in the line 205, as is customary when chlorine in a gaseous state is applied to a main. Such a valve is disclosed in Patent No. 1,285,493 (Wallace) granted November 19, 1918 and is shown in a chlorine gas conduit leading to a main, in Patent No. 1,283,993 (Wallace) granted November 5, 1918; when so incorporated, the valve is set at a pressure somewhat higher than the maximum pressure in the main, and in the present system will act to prevent variations in the main pressure from affecting the accuracy of the manometer reading, i. e. by preventing variation in the density of the gas flowing through the orifice 204.

It is to be understood that the invention is not limited to the specific devices herein shown or described but may be embodied in other forms or ways without departure from its spirit.

I claim:

1. In apparatus for feeding chlorine gas, the combination with structure defining a path for chlorine gas flow and containing flowing chlorine gas and associated means establishing changes in pressure of said chlorine gas in accordance with changes of rate of flow, of liquid-containing means communicating with said means establishing pressure changes, and including a body of conductive liquid exposed to the chlorine gas, and means for changing the level of said liquid in accordance with said pressure changes, a pair of electrodes exposed to said liquid, at least one of said electrodes comprising an electrolytically filmed member of tantalum extending into the liquid from above the level thereof, for variation of the area of exposure of said member to the liquid with change in level of the latter, and means electrically connected to said electrodes, for detecting change in impedance between them, said conductive liquid being an aqueous electrolyte which is not highly reactive with chlorine.

2. In apparatus for feeding chlorine gas, the combination with structure defining a path for chlorine gas flow and containing flowing chlorine gas and associated means establishing changes in pressure of said chlorine gas in accordance with changes of rate of flow, of liquid-containing means communicating with said means establishing pressure changes, and including a body of conductive liquid exposed to the chlorine gas, and means for changing the level of said liquid in accordance with said pressure changes, a pair of filmed tantalum electrodes extending into said liquid from above the level thereof, for variation of the area of exposure of said electrodes to the liquid with change in level of the latter, and means electrically connected to said electrodes for detecting change in impedance between them, said conductive liquid being an aqueous electrolyte which is not highly reactive with chlorine.

3. In apparatus for detecting change of gas flow from a source of supply along a path which includes a resistance and means normally maintaining a predetermined pressure on the upstream side of said resistance, said pressure being adapted to fall upon failure of the supply of gas, in combination, U-tube means having its legs communicating with said path on respectively opposite sides of said resistance, said U-tube means being adapted to contain an electrolytically conductive liquid, means including filmed electrode structure in one leg of said U-tube means and constituting an electrical condenser variable in capacity in accordance with variation of the level of liquid in said leg, translating means having a control circuit connected with said condenser means for response to change of pressure drop across said resistance, normally closed contact means in said control circuit, and pressure-responsive means communicating with the upstream side of said path for opening said contact means upon fall of the upstream pressure below the aforesaid predetermined value, said control circuit including a current source normally maintaining energization of said translating means, whereby the opening of said contact means produces a distinctive de-energized response of the translating means to failure of the gas supply.

4. In apparatus for detecting change of gas flow from a source of supply along a path which includes a resistance and means normally maintaining a predetermined pressure on the upstream side of said resistance, said pressure being adapted to fall upon failure of the supply of gas, in combination, means communicating with said path on opposite sides of said resistance and providing an electrical element variable in impedance in response to variation of pressure drop across said resistance, translating means having a control circuit connected with said electrical element means for response to change of impedance thereof, U-tube means having one leg communicating with the upstream side of said path, said U-tube means being adapted to contain an electrolytically conductive liquid and having an electrode adapted to be continuously exposed to said liquid, said U-tube means having another electrode in the other leg thereof, said electrodes being connected in said control circuit, and said second electrode being disposed so that said control circuit is normally completed through said liquid but so that said liquid falls away from said second electrode and interrupts said circuit when the upstream pressure falls below the aforesaid predetermined value.

5. In apparatus for feeding gas from a source of supply under a vacuum established at a predetermined locality, along a path which includes a resistance between said source and said locality, and means normally maintaining a predetermined lower vacuum on the upstream side of said resistance, said lower vacuum being adapted to rise upon failure of the supply of gas and to fall upon failure of the vacuum established at the predetermined locality, in combination, translating means having a control circuit, a pressure-responsive electrical device communicating with said path, for controlling said circuit in accordance with the pressure drop across said resistance, pressure-responsive means comprising an expansible chamber communicating with the path at the said upstream side of the resistance and contact-operating structure displaceable by said chamber between limits corresponding to vacuum values above and below the aforesaid predetermined vacuum, contact means connected with said circuit and operable by said structure to modify said circuit upon displacement of the structure to either of said limits, and means in said circuit normally maintaining a predetermined energization of said translating means, said contact means being thereby adapted to modify said circuit for interrupting said energization.

6. In apparatus for detecting change in gas pressure, in combination, a container for an electrolytically conductive liquid, a tubular baffle extending into the liquid therein and dividing said container into concentric chambers communicating at the bottom of said container, said container having means engaging said baffle and closing both said chambers, the outer chamber having a passage for communication with a source of gas pressure susceptible of change, a tubular conductor extending into said container, spaced within said tubular baffle, said baffle having an enlarged lower portion, an electrode mounted on the lower end of said conductor within said enlarged baffle portion, and another electrode at a lower part of said container, said conductor being vertically adjustable for adjusting the position of the first mentioned electrode relative to the liquid in the container, said tubular baffle being closed against the outer surface of said tubular conductor by the aforesaid closing means at a locality spaced above the liquid in said baffle, so that access to the space above the liquid in the baffle is provided only by the tubular conductor, the first electrode being disposed to make or break contact with the liquid in accordance with the extent of pressure difference between the chambers.

7. In apparatus for detecting change in fluid pressure, in combination, an expansible chamber to communicate with a source of fluid pressure susceptible of change, a lever having a long arm and a short arm, said chamber including a member moved by and in accordance with expansion of the chamber, and said long arm being engaged by said member for displacement thereby, a pair of switching devices each having contact means and a depressible member for shifting the contact means from a first to a second position, each switching device including means biasing the contact means to the first position and at least one of said devices including a resilient connection of its depressible member to permit its being depressed to shift its contact means and then substantially further depressed while the contact means remains in shifted position, and structure associated with the short arm of the lever for depressing said depressible members as the lever moves from one positional limit to another, the depressible member of the aforesaid one of said devices being disposed in the path of said structure near the first limit, to be depressed by said structure upon departure of the lever from the first limit and being arranged along said path, to remain depressed until the lever returns to said first limit, and the depressible member of the other device being disposed at a locality in the path of said structure adjacent the other limit, to be depressed upon arrival of the lever at the other limit and to be released upon departure of the lever from said other limit.

8. In apparatus for detecting change in gas pressure, in combination, a container for an electrolytically conductive liquid, a tubular baffle extending into the liquid therein and dividing said container into concentric chambers communicating at the bottom of said container, an electrode at a lower part of said container for contact with said liquid, another electrode in the inner chamber, spaced at a level above said first electrode, a tubular member extending down into the baffle to the vicinity of the liquid therein, said member being narrow relative the baffle and being disposed in spaced relation within the latter, passage means opening into the container outside the baffle, for communication with the space surrounding the baffle, and means above the liquid, closing the container around and within the baffle and against the outer surface of the tubular member so that access to the space above the liquid in the inner chamber is provided only by the tubular member, the second electrode being disposed to make or break contact with the liquid in accordance with the extent of pressure difference between the chambers.

9. The apparatus described in claim 8, wherein the tubular member constitutes a conductive member and the second-mentioned electrode is mounted on said tubular member, said tubular member thereby providing electrical connection to said second-mentioned electrode from the exterior of the container.

10. In a chlorine supply system, the combination, with a conduit carrying a flow of chlorine gas and having means establishing changes in pressure in the conduit in accordance with changes of rate of flow of said chlorine gas, of apparatus for detecting flow changes represented by said pressure changes as small as a small fraction of an inch, which comprises, in combination, means containing a body of electrolytically conductive liquid and including structure extending to the chlorine-carrying conduit for control by the means establishing pressure changes, said structure providing direct communication of the interior of said conduit with the interior of said liquid containing means above the liquid therein, whereby the liquid is exposed to the chlorine gas of the conduit and subjected to the pressure changes that correspond to change in rate of flow, said liquid containing means comprising means for changing a level of said liquid in accordance with said pressure changes and said liquid being an aqueous electrolyte which is not highly reactive with chlorine, and a pair of electrolytically filmed tantalum electrodes extending into said liquid from above the aforesaid level thereof, for variation of the area of exposure of said electrodes to the liquid with change in level of the latter, said electrodes and liquid thereby constituting an electrolytic condenser which is adapted to provide, in response to pressure changes of a small fraction of an inch, capacity variations sufficient to produce directly electromagnetically detectable changes in a 60-cycle electric current.

11. In chlorine gas controlled, pressure-responsive measuring apparatus, the combination, with a vessel containing chlorine gas adapted to change in pressure, of manometer structure containing a body of electrolytically conductive liquid and having means communicating with said vessel and opening into the manometer for direct exposure of the liquid to the communicated chlorine gas, to impress changes of pressure of said chlorine gas on said liquid, said manometer being adapted to effect change in level of the liquid in response to said changes of pressure, and said liquid being an aqueous electrolyte which is not highly reactive with chlorine, means including electrolytically filmed electrode structure extending into said body of liquid and providing variation in electrical capacity in accordance with change in level of said liquid, and means electrically connected to said electrode structure for detecting change in the capacity thereof.

12. In chlorine gas controlled, pressure-responsive measuring apparatus, the combination, with a vessel containing chlorine gas adapted to change in pressure, of a U-tube manometer, a body of electrolytically conductive aqueous liquid therein which is not highly reactive with chlorine, said U-tube having a leg thereof communicating with said chlorine-containing vessel for direct exposure of said liquid to chlorine gas, and said body of liquid in the U-tube being adapted to change its level in response to change in chlorine gas pressure communicated to said manometer, electrolytically filmed electrode structure extending into said liquid and adapted to provide variation in electrical capacity in accordance with change of liquid level, and means connected to said electrode structure for detecting change of capacity thereof.

13. In chlorine gas controlled, pressure-responsive measuring apparatus, the combination, with a vessel containing chlorine gas adapted to change in pressure, of manometer structure containing a body of electrolytically conductive liquid and having means communicating with said vessel and opening into the manometer for direct exposure of the liquid to the communicated chlorine gas, to impress changes of pressure of said chlorine gas on said liquid, said manometer being adapted to effect change in level of the liquid in response to said changes of pressure, and said liquid being an aqueous electrolyte which is not highly reactive with chlorine, and a pair of electrodes exposed to said conductive liquid, at least one of said electrodes comprising an electrolytically filmed member of tantalum extending into said liquid from above the level thereof for variation of the area of said tantalum electrode exposed to the liquid, said electrodes and conductive liquid thereby providing a condenser varying in capacity with change in level of the liquid.

14. In chlorine gas controlled, pressure-responsive measuring apparatus, the combination, with a vessel containing chlorine gas adapted to change in pressure, of a U-tube manometer, a body of electrolytically conductive aqueous liquid therein which is not highly reactive with chlorine, said U-tube having a leg thereof communicating with said chlorine-containing vessel for direct exposure of said liquid to chlorine gas, and said body of liquid in the U-tube being adapted to change its level in response to change in chlorine gas pressure communicated to said manometer, and condenser means in said manometer comprising a pair of electrolytically filmed electrodes extending into said liquid in one leg of said U-tube from above the level of liquid in said last-mentioned leg, said condenser means being adapted to vary in electrical capacity with change in area of submergence of said electrodes due to change of liquid level.

CHARLES F. WALLACE.

REFERENCES CITED

The following references are of record in the file of this patent:

UNITED STATES PATENTS

| Number | Name | Date |
|---|---|---|
| 557,534 | Baker | Apr. 7, 1896 |
| 1,120,214 | Metzdorff | Dec. 8, 1914 |
| 1,422,853 | Hansen | July 18, 1922 |
| 1,449,437 | Obermaier | Mar. 27, 1923 |
| 1,913,860 | Spink | June 13, 1933 |
| 1,915,137 | Stevens | June 20, 1933 |
| 2,018,431 | Wolf | Oct. 22, 1935 |
| 2,059,145 | Richardson | Apr. 7, 1936 |
| 2,091,616 | Stoekle | Aug. 31, 1937 |
| 2,103,741 | Bencowitz | Dec. 28, 1937 |
| 2,123,063 | Peters | July 5, 1938 |
| 2,123,470 | Lamb | July 12, 1938 |
| 2,169,088 | Carter | Aug. 8, 1939 |
| 2,213,961 | Hunter | Sept. 10, 1940 |
| 2,225,190 | Weaver et al. | Dec. 17, 1940 |
| 2,232,840 | Claffey | Feb. 25, 1941 |
| 2,266,144 | Baak | Dec. 16, 1941 |
| 2,368,278 | Warshaw | Jan. 30, 1945 |
| 2,448,470 | Rypinski | Aug. 31, 1948 |

FOREIGN PATENTS

| Number | Country | Date |
|---|---|---|
| 574,873 | Germany | Dec. 13, 1929 |